United States Patent
He et al.

(10) Patent No.: US 12,068,955 B2
(45) Date of Patent: Aug. 20, 2024

(54) METHOD FOR CONTROLLING TRAFFIC FORWARDING, DEVICE, AND SYSTEM

(71) Applicant: Huawei Technologies Co., Ltd., Shenzhen (CN)

(72) Inventors: Xingjian He, Nanjing (CN); Haibo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 17/502,466

(22) Filed: Oct. 15, 2021

(65) Prior Publication Data

US 2022/0124033 A1 Apr. 21, 2022

(30) Foreign Application Priority Data

Oct. 21, 2020 (CN) .......................... 202011133176.6
Dec. 30, 2020 (CN) .......................... 202011622415.4

(51) Int. Cl.
*H04L 45/74* (2022.01)

(52) U.S. Cl.
CPC .................................. *H04L 45/74* (2013.01)

(58) Field of Classification Search
CPC ......... H04L 45/74; H04L 45/00; H04L 47/20; H04L 47/33; H04L 47/35
See application file for complete search history.

(56) References Cited

U.S. PATENT DOCUMENTS

| 2011/0305167 | A1 | 12/2011 | Koide | |
|---|---|---|---|---|
| 2011/0317701 | A1 | 12/2011 | Yamato et al. | |
| 2014/0059197 | A1* | 2/2014 | Kitajima | H04L 41/0813 709/223 |
| 2014/0169158 | A1* | 6/2014 | Mishra | H04L 41/40 370/236 |
| 2015/0071111 | A1* | 3/2015 | Tao | H04W 40/20 370/254 |
| 2015/0180769 | A1* | 6/2015 | Wang | H04L 45/38 370/236 |
| 2015/0372902 | A1* | 12/2015 | Giorgetti | H04L 45/38 370/219 |
| 2016/0212048 | A1* | 7/2016 | Kaempfer | H04L 45/745 |
| 2016/0226773 | A1* | 8/2016 | Sundaram | H04L 45/12 |

(Continued)

FOREIGN PATENT DOCUMENTS

| EP | 2445145 A1 | 4/2012 |
|---|---|---|
| JP | 2014154966 A | 8/2014 |

(Continued)

*Primary Examiner* — Tejis Daya
(74) *Attorney, Agent, or Firm* — Conley Rose, P.C.

(57) ABSTRACT

A method for controlling traffic forwarding includes: A control device receives a first packet sent by a first network device, where the first packet includes a first service packet. A destination of the first packet is the control device, a destination of the first service packet is first user equipment, and the first user equipment is connected to a network by using a second network device. Then, the control device determines a first forwarding policy based on the first packet and a first routing entry, where the first forwarding policy is used to guide forwarding of a first data flow to which the first service packet belongs. In addition, the control device sends the first forwarding policy to the first network device.

20 Claims, 6 Drawing Sheets

(56) References Cited

U.S. PATENT DOCUMENTS

| | | | |
|---|---|---|---|
| 2016/0352538 A1* | 12/2016 | Chiu | H04L 45/306 |
| 2016/0373345 A1* | 12/2016 | Li | H04L 45/64 |
| 2018/0183725 A1* | 6/2018 | Ben-Hagai | H04L 49/3009 |
| 2018/0302289 A1* | 10/2018 | Shen | H04L 41/122 |
| 2020/0092026 A1* | 3/2020 | Birk | H04J 14/0257 |
| 2021/0021537 A1 | 1/2021 | Yuan et al. | |
| 2021/0029103 A1 | 1/2021 | Mizukoshi | |
| 2021/0409321 A1 | 12/2021 | Li et al. | |

FOREIGN PATENT DOCUMENTS

| | | |
|---|---|---|
| JP | 2015012531 A | 1/2015 |
| WO | 2011080870 A1 | 7/2011 |
| WO | 2011083780 A1 | 7/2011 |
| WO | 2011154966 A1 | 12/2011 |
| WO | 2019187204 A1 | 10/2019 |
| WO | 2020134017 A1 | 7/2020 |
| WO | 2020181992 A1 | 9/2020 |

* cited by examiner

METHOD FOR CONTROLLING TRAFFIC FORWARDING, DEVICE, AND SYSTEM

CROSS-REFERENCE TO RELATED APPLICATIONS

This claims priority to Chinese Patent Application No. 202011622415.4, filed on Dec. 30, 2020, and Chinese Patent Application No. 202011133176.6, filed on Oct. 21, 2020. The disclosures of the aforementioned applications are hereby incorporated by reference in their entireties.

FIELD

This disclosure relates to the field of communications technologies, and in particular, to a method for controlling traffic forwarding, a device, and a system.

BACKGROUND

An underlay network is a distributed network without a central control node. Devices on the underlay network learn network reachability information through protocol transmission, and each device determines how to perform forwarding. As a result, there is no overall concept, and traffic cannot be controlled from a perspective of an entire network.

An overlay network is a virtualization technology mode overlaid on a network architecture. A general architecture of the overlay network is to implement bearer of applications on the network and service separation from another network without large-scale modification of a basic network. The overlay network is a virtual network built on top of an existing network and includes logical nodes and logical links. The overlay network has independent control and forwarding planes, and a physical network is transparent to a terminal system connected an overlay network edge device. A physical network may extend to a cloud and virtualization by deploying the overlay network. This enables a cloud resource pooling capability to be free from a limitation of the physical network, which is a key to implementing cloud-network convergence. The overlay network is also a network that is built on the underlay network. Nodes in the overlay network communicate through virtual or logical links. Each virtual or logical link corresponds to a path of the underlay network and includes a plurality of coherent links.

A Border Gateway Protocol (BGP) is a core decentralized autonomous routing protocol on the internet. BGP implements reachability between autonomous systems (as) by maintaining an Internet Protocol (IP) routing table or a "prefix" table and is a vector routing protocol. A basic idea of an Ethernet virtual private network (EVPN) is to learn a media access control (MAC) address at a control plane by using the BGP, to implement functions of a layer 2 virtual private network (L2VPN).

In an overlay network scenario, a control device may actively spread routing information to a network device by using a protocol, so that the network device can normally forward a packet, for example, an implementation based on a BGP EVPN. In another possible implementation, the network device may query the control device for routing information as required, for example, an implementation based on a Locator/ID Separate Protocol (LISP). However, in the foregoing implementations, the control device cannot intervene or control a forwarding path.

SUMMARY

This disclosure provides a method for controlling a traffic forwarding path, a control device, and a system, so that the control device implements, based on a packet sent by a network device, intervention and control on a forwarding path of a data flow to which the packet belongs.

According to a first aspect, a method for controlling traffic forwarding is provided. A control device receives a first packet sent by a first network device. The first packet includes a first service packet, a destination of the first packet is the control device, a destination of the first service packet is first user equipment, and the first user equipment is connected to a network by using a second network device. Then, the control device determines a first forwarding policy based on the first packet and a first routing entry. The first forwarding policy is used to guide forwarding of a first data flow to which the first service packet belongs. In addition, the control device sends the first forwarding policy to the first network device.

Based on the solution provided in this embodiment, the control device implements, based on a packet sent by a network device, intervention and control on a forwarding path of a data flow to which the packet belongs. By delivering a forwarding policy, the control device controls, based on a current network status, a path for sending a data flow by the network device. Optionally, the control device receives, through a first tunnel, the first packet sent by the first network device.

In a possible implementation of the first aspect, that the control device determines a first forwarding policy based on the first packet and a first routing entry includes: The control device determines, based on a destination address of the first packet, that the destination of the first packet is the control device; the control device determines the first routing entry based on a destination address of the first service packet; and the control device determines the first forwarding policy based on the first routing entry.

In another possible implementation of the first aspect, the first forwarding policy includes a second routing entry. The second routing entry includes second address information and second next hop information, the second address information is used to identify the first user equipment, and the second next hop information is used to identify a third network device. The method further includes: The control device sends a second forwarding policy to the third network device. The second forwarding policy includes the first routing entry. Optionally, before the control device determines a first forwarding policy based on the first packet and a first routing entry, the method further includes: The control device determines, based on the first packet and the first routing entry, that a link from the first network device to the second network device is congested or faulty. Optionally, the third network device is a firewall.

In still another possible implementation of the first aspect, before the control device receives a first packet sent by a first network device, the method further includes: The control device receives first user equipment information sent by the second network device, where the first user equipment information includes the first address information and first location information, and the first location information indicates the first next hop information; and the control device determines the first routing entry based on the first user equipment information. Optionally, the first user equipment information further includes at least one of the following information: a second priority and a second virtual private network (VPN) identifier. The second priority is used to indicate a priority of the first user equipment, and the second VPN identifier is used to indicate a VPN to which the first user equipment belongs.

In yet another possible implementation of the first aspect, the control device forwards the first packet to the second network device based on the first routing entry.

In still yet another possible implementation of the first aspect, the control device receives a third packet sent by the first network device. The third packet includes a third service packet. A destination of the third packet is the control device, and a destination of the third service packet is second user equipment. The second user equipment is connected to the network by using the second network device. The control device determines, based on a destination address of the third packet, that the destination of the third packet is the control device. The control device determines a third routing entry based on a destination address of the third service packet. The third routing entry includes third address information and third next hop information. The third address information is used to identify the second user equipment, and the third next hop information is used to identify the second network device. The control device determines a level of a session from third user equipment to the second user equipment based on the third service packet. A source address of the third service packet identifies the third user equipment. The control device blocks sending of a third forwarding policy to the first network device based on the level. The third forwarding policy is used to guide forwarding of a second data flow to which the third service packet belongs. Optionally, the control device forwards the third packet to the second network device based on the third routing entry. Optionally, the control device receives, through the first tunnel, the third packet sent by the first network device.

According to a second aspect, a method for controlling traffic forwarding is provided. A first network device receives a first service packet sent by third user equipment. A destination of the first service packet is first user equipment, and the first user equipment is connected to a network by using a second network device. Then, the first network device determines, based on a destination address of the first service packet, that the first network device does not include a first routing entry. The first routing entry indicates a forwarding path of the first service packet. The first network device sends a first packet to a control device in response to that the first network device determines that the first network device does not include the first routing entry. A destination of the first packet is the control device, and the first packet includes the first service packet. In addition, the first network device receives a first forwarding policy sent by the control device. The first forwarding policy is used to guide forwarding of a first data flow to which the first service packet belongs.

Based on the solution provided in this embodiment, when determining that a corresponding forwarding entry cannot be searched out, a network device sends a packet to the control device through a tunnel for processing. Then the control device implements, based on the packet sent by the network device, intervention and control on a forwarding path of a data flow to which the packet belongs. By delivering a forwarding policy, the control device controls, based on a current network status, a path for sending a data flow by the network device. Optionally, the first network device sends, through a first tunnel, the first packet to the control device.

In a possible implementation of the second aspect, before the first network device sends a first packet to a control device, the method further includes: The first network device generates the first packet based on a default routing entry. The default routing entry includes default address information and default next hop information, and the default next hop information is used to identify the control device. Optionally, the default address information includes a default IP address and a default mask, a value of the default IP address is zero, and a value of the default mask is 0. Optionally, the default address information includes a default MAC address, and a value of the default MAC address is zero.

In another possible implementation of the second aspect, the method further includes: The first network device receives a second service packet sent by the third user equipment, where a destination of the second service packet is the first user equipment; and the first network device sends the second service packet to the second network device according to the first forwarding policy.

In still another possible implementation of the second aspect, the first forwarding policy includes a second routing entry. The second routing entry includes second address information and second next hop information. The second address information is used to identify the first user equipment, and the second next hop information is used to identify a third network device. Optionally, the method further includes: The first network device receives a second service packet sent by the third user equipment, where a destination of the second service packet is the first user equipment; and the first network device sends the second service packet to the third network device according to the first forwarding policy.

In the first aspect or the second aspect, optionally, the first forwarding policy includes the first routing entry.

In the first aspect or the second aspect, optionally, the first forwarding policy further includes at least one of the following information: a first priority, a first rate, and a first VPN identifier. The first priority is used to indicate a priority of sending the first data flow by the first network device, the first rate is used to indicate a rate of sending the first data flow by the first network device, and the first VPN identifier is used to indicate a VPN to which the first user equipment belongs.

In the first aspect or the second aspect, optionally, the first tunnel is any one of the following tunnels: a Virtual eXtensible Local Area Network (VXLAN) tunnel, a multi-protocol label switching (MPLS)-based tunnel, a segment routing (SR) tunnel, and a Generic Routing Encapsulation (GRE) tunnel.

In the first aspect or the second aspect, optionally, the network is a campus network. The campus network includes the control device, the first network device, and the second network device. The control device is a core network device, and the first network device and the second network device are edge network devices.

In addition, a method for controlling traffic forwarding is provided. The control device receives a third packet sent by the first network device. The third packet includes a third service packet. A destination of the third packet is the control device, and a destination of the third service packet is the second user equipment. The second user equipment is connected to a network by using the second network device. The control device determines, based on a destination address of the third packet, that the destination of the third packet is the control device. The control device determines a third routing entry based on a destination address of the third service packet. The third routing entry includes third address information and third next hop information. The third address information is used to identify the second user equipment, and the third next hop information is used to identify the second network device. The control device determines a level of a session from the third user equipment to the second user equipment based on the third service packet. A source address of the third service packet identifies the third user equipment. The control device blocks sending of a third forwarding policy to the first network device based on the level. The third forwarding policy is used to guide forwarding of a second data flow to which the third service packet belongs. Optionally, the control device forwards the third packet to the second network device based on the third routing entry. Optionally, the control device receives, through the first tunnel, the third packet sent by the first network device.

According to a third aspect, a control device is provided. The control device has a function of implementing behavior of the control device in the foregoing methods. The function may be implemented based on hardware, or may be implemented based on hardware executing corresponding software. The hardware or the software includes one or more modules corresponding to the foregoing function.

In a possible design, a structure of the control device includes a processor and an interface. The processor is configured to support the control device in performing a corresponding function in the foregoing methods. The interface is configured to support communication between the control device and a first network device, and receive information or instructions in the foregoing methods from the first network device. The interface is further configured to support communication between the control device and another network device. The control device may further include a memory. The memory is configured to be coupled to the processor, and stores program instructions and data that are necessary for the control device.

In another possible design, the control device includes a processor, a transmitter, a receiver, a random access memory (RAM), a read-only memory (ROM), and a bus. The processor is separately coupled to the transmitter, the receiver, the RAM, and the ROM through the bus. When the control device needs to run, a bootloader in a basic input/output system (BIOS) or an embedded system that is built into the ROM is used to boot a system to start, and boot the control device to enter a normal running state. After the control device enters the normal running state, an application program and an operating system are run in the RAM, to enable the processor to perform the method in any one of the first aspect or the possible implementations of the first aspect.

According to a fourth aspect, a control device is provided. The control device includes a main control board and an interface board, and may further include a switching board. The control device is configured to perform the method in any one of the first aspect or the possible implementations of the first aspect. Specifically, the control device includes a module configured to perform the method in any one of the first aspect or the possible implementations of the first aspect.

According to a fifth aspect, a control device is provided. The control device includes a controller and a first forwarding sub-device. The first forwarding sub-device includes an interface board, and may further include a switching board. The first forwarding sub-device is configured to perform a function of the interface board in the fourth aspect, and may further perform a function of the switching board in the fourth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a BIOS or an embedded system that is built into the ROM is used to boot a system to start, and boot the controller to enter a normal running state. After the controller enters the normal running state, an application program and an operating system are run in the RAM, to enable the processor to implement functions of the main control board in the fourth aspect.

According to a sixth aspect, a computer storage medium is provided. The computer storage medium is configured to store a program, code, or instructions used by the foregoing control device. When executing the program, the code, or the instructions, a processor or a hardware device can implement the functions or steps of the control device in the first aspect.

According to a seventh aspect, a first network device is provided. The first network device has a function of implementing behavior of the first network device in the foregoing methods. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device in performing a corresponding function in the foregoing methods. The interface is configured to support communication between the first network device and a control device, send information or instructions in the foregoing methods to the control device, or receive information or instructions in the foregoing methods that are sent by the control device. The interface is further configured to support communication between the control device and another network device and user equipment. The first network device may further include a memory. The memory is configured to be coupled to the processor, and stores program instructions and data that are necessary for the first network device.

In another possible design, the first network device includes a processor, a transmitter, a receiver, a RAM, a ROM, and a bus. The processor is separately coupled to the transmitter, the receiver, the RAM, and the ROM through the bus. When the first network device needs to run, a bootloader in a BIOS or an embedded system that is built into the ROM is used to boot a system to start, and boot the first network device to enter a normal running state. After the first network device enters the normal running state, an application program and an operating system are run in the RAM, to enable the processor to perform the method in any one of the second aspect or the possible implementations of the second aspect.

According to an eighth aspect, a first network device is provided. The first network device includes a main control board and an interface board, and may further include a switching board. The first network device is configured to perform the method in any one of the second aspect or the possible implementations of the second aspect. Specifically, the first network device includes a module configured to perform the method in any one of the second aspect or the possible implementations of the second aspect.

According to a ninth aspect, a first network device is provided. The first network device includes a controller and a second forwarding sub-device. The second forwarding sub-device includes an interface board, and may further include a switching board. The second forwarding sub-device is configured to perform a function of the interface board in the eighth aspect, and may further perform a function of the switching board in the eighth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a BIOS or an embedded system that is built into the ROM is used to boot a system to start, and boot the controller to enter a normal running state. After the controller enters the normal running state, an application program and an operating system are run in the RAM, to enable the processor to implement functions of the main control board in the eighth aspect.

According to a tenth aspect, a computer storage medium is provided. The computer storage medium is configured to store a program, code, or instructions used by the foregoing first network device. When executing the program, the code, or the instructions, a processor or a hardware device can implement the functions or steps of the first network device in the second aspect.

According to an eleventh aspect, a network system is provided. The network system includes a control device and a first network device. The control device is the control device in the third aspect, the fourth aspect, or the fifth aspect, and the first network device is the first network device in the seventh aspect, the eighth aspect, or the ninth aspect.

Based on the foregoing solutions, the control device implements, based on a packet sent by a network device, intervention and control on a forwarding path of a data flow to which the packet belongs. Correspondingly, the network device forwards a packet flow according to a forwarding policy and an intervention and control requirement of the control device.

DETAILED DESCRIPTION

The following describes the technical solutions in detail by using specific embodiments.

Figure 1:
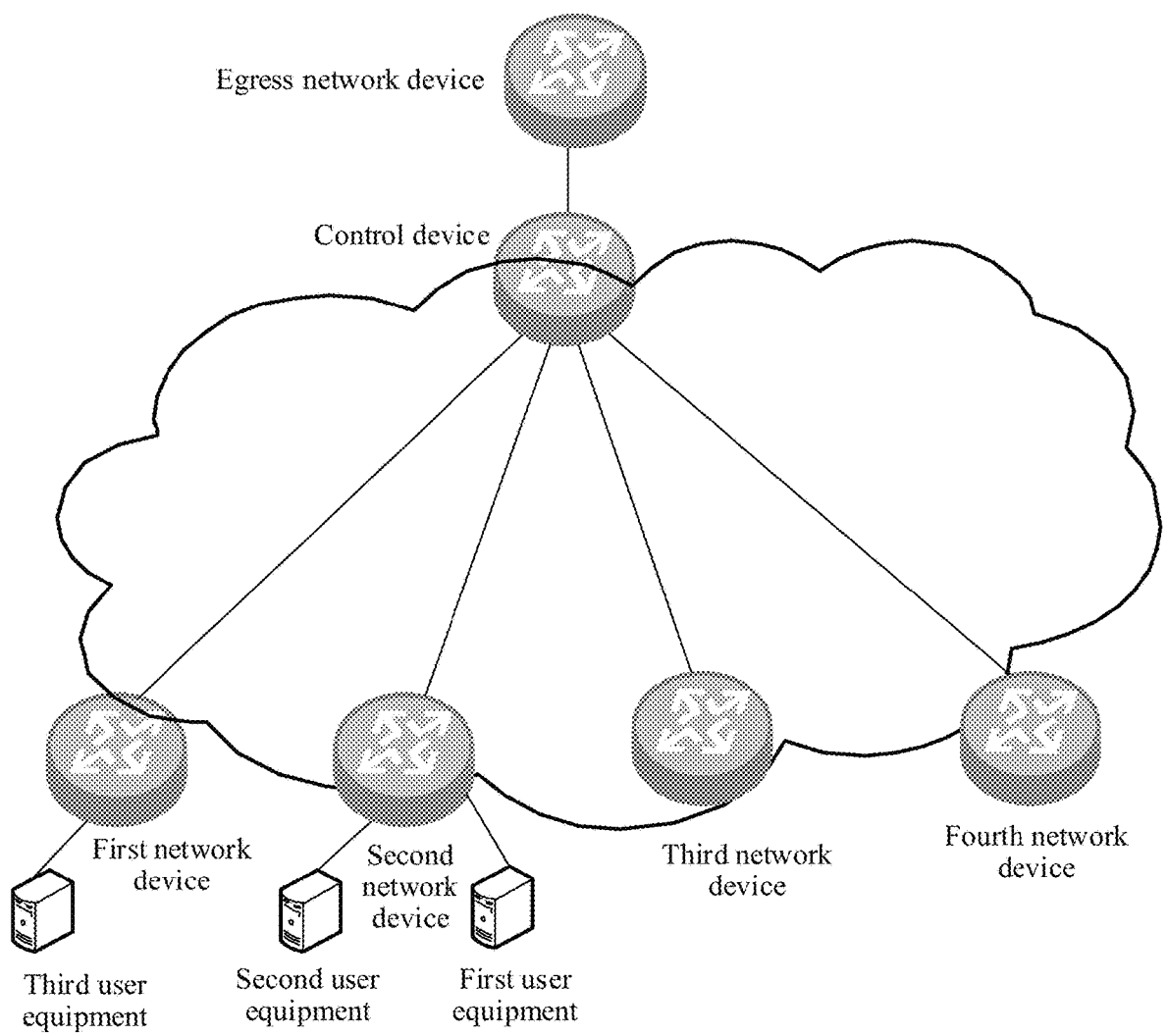
FIG. 1 is a schematic diagram of a structure of a communications network according to an embodiment.

FIG. 1 is a schematic diagram of a structure of a communications network according to an embodiment. The communications network may be, for example, a campus network. The communications network includes a plurality of network devices, the plurality of network devices include a control device and a plurality of forwarding devices, and the plurality of forwarding devices include a first network device, a second network device, a third network device, and a fourth network device. The plurality of forwarding devices may be switches or routers, and the control device may be a switch or a router. In a possible implementation, the control device may be a route reflector (RR). In the scenario shown in FIG. 1, the plurality of forwarding devices may be edge network devices, for example, edge switches or edge routers. The network device may be a core network device, for example, a core switch or a core router. The control device communicates with each network device in the plurality of forwarding devices by using a communication link. Any two network devices in the plurality of forwarding devices may communicate with each other by using a communication link. The communication link may be a wired link, or may be a wireless link. The communication link may be a direct link, or a link on which another network device exists. Each network device in the plurality of forwarding devices may be connected to one or more user equipments. For example, in FIG. 1, the first network device is connected to third user equipment, and the second network device is connected to first user equipment and second user equipment. The user equipment in FIG. 1 may be a server, a virtual machine (VM), or a terminal device. The terminal device may be a personal computer, a portable computer, a smartphone, a PAD, or the like. The control device may be connected to an egress network device, and the egress network device is configured to communicate with another network other than the communications network. For example, the control device receives traffic from the plurality of forwarding devices, and forwards the traffic to another network through the egress network device. For another example, the egress network device receives traffic from another network, and sends the traffic to the plurality of forwarding devices through the control device. The traffic finally arrives at the user equipment.

Tunnels may be established between the control device and the plurality of forwarding devices. For example, a first tunnel is included between the control device and the first network device, a second tunnel is included between the control device and the second network device, a third tunnel is included between the control device and the third network device, and a fourth tunnel is included between the control device and the fourth network device. In a VXLAN scenario, the communications network shown in FIG. 1 is a VXLAN, and the foregoing tunnels may be VXLAN tunnels. In an SR scenario, the communications network shown in FIG. 1 is an SR network, and the foregoing tunnels may be SR tunnels. In an MPLS scenario, the communications network shown in FIG. 1 is an MPLS network, and the foregoing tunnels may be MPLS-based tunnels. In a GRE scenario, the communications network shown in FIG. 1 is a GRE network, and the foregoing tunnels may be GRE tunnels.

The control device includes a full mesh topology of the communications network, that is, the control device stores routing entries of the entire communications network.

In a possible implementation, the control device may serve as an RR, and establish peer relationships with the plurality of forwarding devices based on a BGP. For example, the control device establishes a peer relationship with the first network device, and the control device advertises a routing entry to the first network device based on the BGP. In addition, when a topology of the communications network changes (for example, a new forwarding device goes online or an original forwarding device goes offline), the control device may also advertise the routing entry to the first network device based on the BGP, to notify a route change. The first network device updates a local routing table based on the received routing entry. Therefore, the first network device may generate a plurality of forwarding entries based on the routing table, to guide traffic forwarding. The plurality of forwarding entries may be stored in a local forwarding table of the first network device. Similarly, the control device may also advertise routing entries to the second network device, the third network device, and the fourth network device. Optionally, the foregoing implementation may be implemented based on a BGP EVPN protocol.

In another possible implementation, the forwarding device in the communications network may obtain a corresponding route by querying routes as required. For a LISP-based implementation, the control device serves as a server, and the plurality of forwarding devices serve as clients. For example, the first network device sends a request message (for example, a map-request message) to the control device based on traffic received from the third user equipment. The request message is used to request a routing entry used by the first network device to forward the foregoing traffic. The control device generates a corresponding reply message (for example, a map-reply message), where the reply message carries the routing entry used to forward the foregoing traffic. The control device sends the reply message to the first network device. The first network device updates the locally stored routing table based on the reply message.

In the foregoing implementation, for a BGP-based implementation, the control device needs to advertise a large number of routing entries to the forwarding device. In addition, there may be unfixed user equipment in the communications network. For example, the user equipment is a mobile terminal, and the mobile terminal accesses an access point (AP) through Wi-Fi. Roaming of the mobile terminal will restrict BGP route advertisement. For the LISP-based implementation, the control device needs to complete a process of querying routes as required based on a mechanism of a request message and a reply message. In addition, in the foregoing two implementations, the control device implements route advertisement and query based on stored routing entries, and the control device cannot intervene or control a forwarding path of a data flow to which a packet belongs.

To resolve the foregoing problem, this embodiment provides a corresponding solution. As shown in FIG. 1, the first network device receives a first service packet sent by the third user equipment. If the first network device searches out no matching forwarding entry in the forwarding table of the first network device based on destination address information of the first service packet, the first network device encapsulates the first service packet according to a tunneling protocol to obtain a first packet. The first network device sends the first packet to the control device, so that the control device processes the first packet. The control device generates a first forwarding policy based on the first packet and the routing entry stored by the control device. The first forwarding policy is used to guide forwarding of a first data flow to which the first service packet belongs. In a process of generating the first forwarding policy, the control device may consider a forwarding path of the first data flow based on the routing entry stored by the control device, and may also consider the forwarding path of the first data flow based on factors such as a current link quality and security and permission levels of source user equipment of the first data flow. Therefore, the first forwarding policy generated by the control device may be used to implement intervention and control on the forwarding path of the data flow to which the packet belongs. The control device sends the first forwarding policy to the first network device through the first tunnel. The first network device may update a routing entry in the local routing table of the first network device according to the first forwarding policy, and update a corresponding forwarding entry based on an updated routing entry. The first network device forwards the first data flow based on an updated forwarding entry. Therefore, in the foregoing implementation, the control device implements, based on a packet sent by a network device, intervention and control on a forwarding path of a data flow to which the packet belongs. Correspondingly, the network device forwards a packet flow according to a forwarding policy and an intervention and control requirement of the control device.

Figure 2:
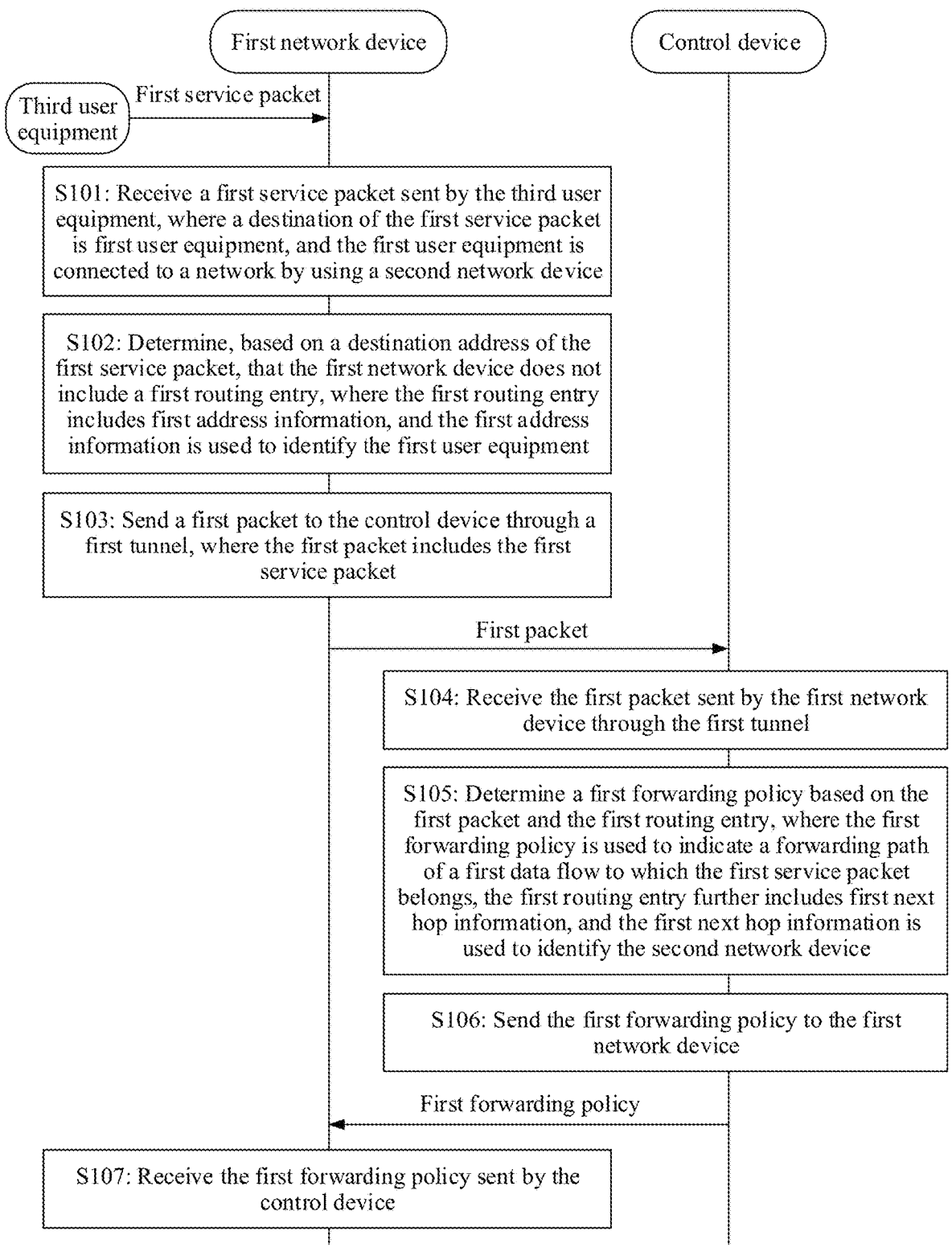
FIG. 2 is a flowchart of a method for controlling traffic forwarding according to an embodiment.

FIG. 2 is a flowchart of a method for controlling traffic forwarding according to an embodiment. The method shown in FIG. 2 may be applied to the network structure shown in FIG. 1. In this implementation, interaction between the first network device and the control device in FIG. 1 is described. It should be understood that another network device may exist on a communication link between the first network device and the control device. In explanation and description of this implementation, an example in which the communications network shown in FIG. 1 is a VXLAN is used for description. Correspondingly, the tunnel between the first network device and the control device is a VXLAN tunnel. It should be understood that the method shown in FIG. 2 may also be applied to another overlay network scenario, for example, the SR network, the MPLS network, or the GRE network mentioned above. The method includes the following steps.

S101: A first network device receives a first service packet sent by third user equipment, where a destination of the first service packet is first user equipment.

As shown in FIG. 1, the first network device may communicate with the third user equipment, and a second network device may communicate with the first user equipment. The third user equipment sends traffic data to the first user equipment. The third user equipment encapsulates the traffic data to obtain the first service packet. A packet header of the first service packet includes a source address and a destination address. The source address identifies the third user equipment, and is used to indicate a transmit end device of the first service packet. The source address may be an IP address, that is, a source IP address. Alternatively, the source address may be a MAC address, that is, a source MAC address. The source IP address may be a device IP address of the third user equipment, and the source MAC address may be a device MAC address of the third user equipment. The destination address identifies the first user equipment, and is used to indicate a receive end device of the first service packet. In other words, a destination of the first service packet is the first user equipment. The destination address may be an IP address, that is, a destination IP address. Alternatively, the destination address may be a MAC address, that is, a destination MAC address. The destination IP address may be a device IP address of the first user equipment, and the destination MAC address may be a device MAC address of the first user equipment. The second network device is connected to the first user equipment, and traffic arriving at the first user equipment needs to be forwarded by the second network device, so that a next hop device of the first user equipment is the second network device. Therefore, the foregoing mentioned next hop device refers to a next hop device of a route. In other words, a next hop device of a route of the first user equipment is the second network device. In other words, the first user equipment is connected to a network by using the second network device, and the network may be a campus network.

The third user equipment sends the first service packet to the first network device after generating the first service packet. The first network device receives the first service packet.

S102: The first network device determines, based on a destination address of the first service packet, that the first network device does not include a first routing entry. The first routing entry includes first address information and first next hop information, the first address information is used to identify the first user equipment, and the first next hop information is used to identify the second network device.

After receiving the first service packet, the first network device parses the first service packet. The first network device obtains the destination address in the first service packet. The first network device searches for a forwarding entry in the first network device based on the destination address of the first service packet.

If the first network device can search out a corresponding forwarding entry, a local routing table of the first network device includes the first routing entry. The first routing entry includes the first address information and the first next hop information, the first address information is used to identify the first user equipment, and the first next hop information is used to identify the second network device. Specifically, the first network device may match the first address information with the destination address of the first service packet. When the first address information matches the destination address of the first service packet, the first network device may determine the corresponding first next hop information. In this way, the first network device may encapsulate the first service packet based on the corresponding forwarding entry, and directly forward the first service packet obtained through encapsulation to the second network device. Therefore, after receiving the first service packet obtained through encapsulation, the second network device obtains the first service packet, and forwards the first service packet to the first user equipment.

If the first network device searches out no corresponding forwarding entry based on the destination address of the first service packet, the first network device can determine that the first network device does not include the first routing entry.

In an implementation, address information may be an IPv4 address, an IPv6 address, a MAC address, or a segment identifier (SID) label.

S103: The first network device sends a first packet to the control device, where the first packet includes the first service packet. Optionally, the first network device sends the first packet to the control device through a first tunnel.

It can be learned from step S102 that the first network device determines, based on the destination address of the first service packet, that the first network device does not include the first routing entry. In this case, the first network device forwards the first service packet to the control device through the first tunnel. The first tunnel is a tunnel between the first network device and the control device. In this embodiment, a VXLAN scenario is used as an example for description. Therefore, in the following description, the first tunnel is expressed as a first VXLAN tunnel.

The following describes a specific implementation in which the first network device forwards the first service packet to the control device through the first VXLAN tunnel.

In the VXLAN scenario, the first network device is a VXLAN tunnel endpoint (VTEP) device, and is located at one end of the first VXLAN tunnel. The control device may be used as a VTEP device, and is located at the other end of the first VXLAN tunnel. The first network device determines, based on the destination address of the first service packet, that the first network device does not include the first routing entry. The first network device encapsulates the first service packet to obtain the first packet. The first packet includes the first service packet and a first tunnel header. The first packet may be a VXLAN packet, and the first tunnel header may include a VXLAN header. The first tunnel header includes a source address and a destination address. The source address identifies the first network device, and is used to indicate a transmit end device of the first packet. The source address may be an IP address, that is, a source IP address. Alternatively, the source address may be a MAC address, that is, a source MAC address. The source IP address may be a device IP address of the first network device, and the source MAC address may be a device MAC address of the first network device. The destination address identifies the control device, and is used to indicate a receive end device of the first packet. In other words, a destination of the first packet is the control device. The destination address may be an IP address, that is, a destination IP address. Alternatively, the destination address may be a MAC address, that is, a destination MAC address. The destination IP address may be a device IP address of the control device, and the destination MAC address may be a device MAC address of the control device. In the VXLAN scenario, the source address and the destination address are usually IP addresses, which may also be referred to as VTEP addresses. After the first network device generates the first packet, the first network device sends the first packet to the control device through the first tunnel.

In the foregoing implementation, a rule may be configured in the first network device, so that when determining that a data packet cannot match a routing entry, the first network device sends the data packet to the control device through tunnel forwarding. For example, the first network device includes a default routing entry, and the default routing entry includes default address information and default next hop information. The default address information indicates address information used when the first routing entry is not searched out in the first network device. The default next hop information is used to identify the control device. For example, a value of the default address information is set to all-zero, and a value of the default next hop information is set to an address of the control device. After the first network device determines that the first routing entry is not searched out, the first network device generates the first packet based on the default routing entry, and forwards the first packet to the control device. Specifically, after the first network device determines that the first routing entry is not searched out, the first network device determines that the destination address of the first service packet matches the default address information. Then, the first network device uses the default next hop information as a destination address of the first packet, to obtain the first packet. Therefore, the first network device can send the first packet to the control device through the first tunnel.

In a possible implementation, the first network device may forward the first packet at a layer 2 (data link layer) based on the default routing entry. In this way, the default routing entry may be referred to as a default MAC routing entry, and the default MAC routing entry includes a default MAC address and the default next hop information. A value of the default MAC address is zero.

In another possible implementation, the first network device may forward the first packet at a layer 3 (network layer) based on the default routing entry. In this way, the default routing entry may be referred to as a default IP routing entry, and the default IP routing entry includes a default IP address, a default mask, and the default next hop information. A value of the default IP address is zero, and a value of the default mask is zero. The default IP address and the default mask correspond to the foregoing default address information.

S104: The control device receives the first packet sent by the first network device. Optionally, the control device receives, through the first tunnel, the first packet sent by the first network device.

For example, the control device receives, through the first tunnel, the first packet sent by the first network device. In the VXLAN scenario, the first tunnel is the first VXLAN tunnel, the first packet is a first VXLAN packet, and the control device may serve as the VTEP device of the first VXLAN tunnel to receive the first VXLAN packet.

S105: The control device determines a first forwarding policy based on the first packet and the first routing entry, where the first forwarding policy is used to guide forwarding of a first data flow to which the first service packet belongs.

After receiving the first packet, the control device parses the first packet to obtain the first service packet. Further, the control device determines the first forwarding policy based on the first packet and the first routing entry, where the first forwarding policy is used to guide forwarding of the first data flow to which the first service packet belongs. Therefore, the first network device may forward the first data flow according to the first forwarding policy. In this implementation, a data flow may also be referred to as a service flow, that is, the first data flow may also be referred to as a first service flow. The data flow includes a plurality of service packets. After the plurality of service packets are sent by user equipment to a network device, the network device encapsulates the plurality of service packets, and sends an encapsulated packet through a tunnel. Because the encapsulated packet includes the service packet, the encapsulated packet may also be considered as a packet belonging to the data flow.

Optionally, the control device may determine, based on the first packet, whether the first forwarding policy needs to be sent to the first network device. Specifically, the control device determines, based on the destination address of the first packet and the destination address of the first service packet, whether the first forwarding policy needs to be sent to the first network device.

In a possible implementation, the control device determines, based on the destination address of the first packet, that the destination of the first packet is the control device itself. In addition, the control device searches, based on the destination address of the first service packet, whether the control device stores the first routing entry. If the control device stores the first routing entry, the control device may determine that a next hop device corresponding to the destination address of the first service packet is the second network device other than the control device itself. In this way, the control device determines that a network device indicated by the destination address of the first packet is inconsistent with a network device indicated by the first next hop information in the first routing entry. Therefore, the control device determines that the first forwarding policy needs to be sent to the first network device. In other words, the control device may determine, based on the foregoing determined inconsistency, that the first network device generates and sends the first packet based on the default routing entry. Then, the control device determines the first forwarding policy based on the first routing entry. If the control device does not include the first routing entry, the control device may determine that the first service packet is not to be forwarded to user equipment in the communications network, but is to be forwarded to user equipment outside the communications network, for example, user equipment in another communications network. In this way, the control device determines that the first forwarding policy does not need to be sent to the first network device. The control device may forward the first packet outside the communications network through the egress network device in FIG. 1 based on a normal forwarding procedure.

The following describes the first forwarding policy determined by the control device.

In a possible implementation, the first forwarding policy includes the first routing entry. After the control device determines that the first forwarding policy needs to be sent to the first network device, the control device generates the first forwarding policy based on the first routing entry. Specifically, the control device determines, based on the first routing entry and the source address of the first packet, that the first data flow to which the first service packet belongs is a data flow sent from the first network device to the second network device. Therefore, the control device may determine that a first link between the first network device and the second network device is used to transmit the first data flow. Then, the control device determines a link quality of the first link. The link quality may be information related to a packet loss rate, congestion, a failure, a signal-to-noise ratio, or a delay. For example, the control device may determine the link quality of the first link as follows: A Bidirectional Forwarding Detection (BFD) session is established between the first network device and the second network device. Then, the first network device and the second network device send a BFD packet to each other. The first network device and the second network device check the link quality based on the BFD packet. The first network device and the second network device report a detection result to the control device after detection. Optionally, the first network device and the second network device may report the detection result based on the BGP. The control device determines, based on the link quality of the first link, that the first link is capable of transmitting the first data flow. For example, if the first link is not congested or faulty, the control device determines that the first link can be used to transmit the first data flow. For another example, if a packet loss rate of the first link is less than a threshold, the control device determines that the first link can be used to transmit the first data flow. The control device generates the first forwarding policy after determining that the first link can be used to transmit the first data flow, where the first forwarding policy includes the first routing entry.

In a possible implementation, the first forwarding policy includes a second routing entry. The second routing entry includes second address information and second next hop information. The second address information is used to indicate the first user equipment, and the second next hop information is used to identify a third network device. After the control device determines that the first forwarding policy needs to be sent to the first network device, the control device generates the first forwarding policy based on the first routing entry. Specifically, with reference to the foregoing implementation, the control device determines, based on the link quality of the first link, that the first link does not meet a requirement for transmitting the first data flow. For example, if the first link is congested or faulty, the control device determines not to use the first link to transmit the first data flow. For another example, if a packet loss rate of the first link is greater than the threshold, the control device determines not to use the first link to transmit the first data flow. The control device determines, based on topology information, that paths from the first network device to the second network device further include a backup path, where the backup path is a path from the first network device to the second network device via the third network device. Optionally, the control device may detect a link quality between the first network device and the third network device and detect a link quality between the third network device and the second network device in the foregoing test manner. When the link qualities meet the requirement for transmitting the first data flow, the control device generates a corresponding routing entry of the backup path. Specifically, the control device generates the second routing entry. The second routing entry includes the second address information and the second next hop information. The second address information is used to identify the first user equipment, and the second next hop information is used to identify the third network device. Then, the control device generates the first forwarding policy and a second forwarding policy, where the first forwarding policy includes the second routing entry, and the second forwarding policy includes the first routing entry. In addition, the control device sends the first forwarding policy to the first network device and sends the second forwarding policy to the third network device. In this way, according to the first forwarding policy including the second routing entry, a packet belonging to the first data flow may be sent by the first network device to the third network device. Then, the third network device forwards the packet belonging to the first data flow to the second network device according to the second forwarding policy including the first routing entry. In this way, the first data flow arrives at the second network device through the backup path, and the second network device forwards service traffic in the first data flow to the first user equipment. It should be understood that, in a variant implementation of the foregoing implementation, the control device determines possible paths from the first network device to the second network device based on the first packet, detects link qualities of the paths, selects a path with a best link quality, determines a routing entry, and sends a forwarding policy to a network device associated with the routing entry.

In the foregoing implementation, the control device determines, based on link qualities of forwarding paths, to select the backup path to transmit the first data flow, but does not select a link that is directly from the first network device to the second network device to transmit the first data flow. In another possible implementation, the control device may not determine to select the backup path to transmit the first data flow based on the link qualities of the forwarding paths. After receiving the first packet, the control device determines, based on the first packet, that the first data flow is from a network device with a relatively low security level. In addition, the third network device is a firewall. Therefore, the control device selects the backup path to transmit the first data flow, so that the first data flow can arrive at the second network device after passing through the firewall (the third network device).

In the foregoing implementation, optionally, the first forwarding policy further includes at least one of the following information: a first priority, a first rate, and a first virtual private network (VPN) identifier. The first priority is used to indicate a priority of sending the first data flow by the first network device, the first rate is used to indicate a rate of sending the first data flow by the first network device, and the first VPN identifier is used to indicate a VPN to which the first user equipment belongs. The control device may not only add a routing entry to a forwarding policy, and send the routing entry to a network device, but also add a policy control parameter to the forwarding policy. The policy control parameter may be a priority, a rate, or a VPN identifier. For example, the control device determines, based on the first packet, that the first data flow is a video service that has a relatively high requirement on real-timeliness, and the control device delivers, to the first network device, the first forwarding policy that carries the first rate, to improve a transmission rate of the first data flow. For example, the control device determines, based on the first packet, the VPN to which the first user equipment belongs, and then includes the first VPN identifier in the first forwarding policy, so that the first network device can send, based on the VPN identifier, the packet that belongs to the first data flow. In this implementation, the VPN identifier may be a VXLAN network identifier (VNI) or an EVPN identifier.

In the foregoing implementation, the control device may send the forwarding policy to the network device based on a BGP message.

With reference to the foregoing description, the control device stores the topology information, so that the control device can generate a corresponding routing entry. Therefore, before the communications network in which the control device is located runs, the control device collects user equipment information of each user equipment. Alternatively, during running of the communications network, the control device may receive an update message that carries user equipment information. For example, before the control device receives, through the first tunnel, the first packet sent by the first network device, the control device receives first user equipment information sent by the second network device. The first user equipment information includes the first address information and first location information, and the first location information indicates the first next hop information. Corresponding to the foregoing implementation, the first user equipment information further includes at least one of the following information: a second priority and a second VPN identifier. The second priority is used to indicate a priority of the first user equipment, and the second VPN identifier is used to indicate a VPN to which the first user equipment belongs. In this way, the control device may obtain user equipment information of user equipments connected to the first network device, the second network device, the third network device, and the fourth network device. The control device generates a corresponding routing entry based on the obtained user equipment information of each user equipment. In a possible implementation, a network device may report user equipment information to the control device by sending a BGP message. In addition, the control device may obtain the user equipment information of each user equipment from a Dynamic Host Configuration Protocol (DHCP) server. Alternatively, the control device obtains the user equipment information of each user equipment based on a data packet learning manner.

Based on the foregoing description, after the first network device receives the first service packet sent by the third user equipment, the first network device searches out no corresponding first routing entry based on the destination address of the first service packet. The first network device encapsulates the first service packet into the first packet and sends the first packet to the control device through the first tunnel. In this way, the first network device requests the control device to forward the first packet on behalf of the first network device. With reference to the foregoing description, after receiving the first packet, the control device generates the first forwarding policy based on the first packet, and sends the first forwarding policy to the first network device. In this way, the first forwarding policy may guide the first network device through sending the first data flow. In this way, the first network device does not need to send a packet in the first data flow to the control device, but directly sends the packet in the first data flow to a destination. Correspondingly, the control device forwards the first packet to the second network device based on the first routing entry, to avoid packet loss caused because the first network device cannot search out the first routing entry.

For example, the first network device receives a second service packet sent by the third user equipment, where a destination of the second service packet is the first user equipment. The first network device sends a second packet to the second network device according to the first forwarding policy, where the second packet includes the second service packet.

For example, the control device may select the backup path to transmit the packet in the first data flow. In this case, the first network device receives the second service packet sent by the third user equipment, where the destination of the second service packet is the first user equipment. The first network device sends the second packet to the third network device according to the first forwarding policy, where the second packet includes the second service packet. Correspondingly, the third network device forwards the second packet to the second network device according to the second forwarding policy.

With reference to the foregoing description, the control device may only forward a packet on behalf of the network device based on a level of a session, but does not send a forwarding policy to the network device. The level of the session may be a permission level or a security level of a session from a source of the packet to a destination of the packet. For example, the control device considers that the source of the packet is insecure user equipment. Alternatively, the control device considers that user equipment used as the source of the packet has a relatively low permission level. In this way, the control device does not send the forwarding policy to the network device. For example, the control device receives, through the first tunnel, a third packet sent by the first network device. The third packet includes a third service packet. A destination of the third packet is the control device, and a destination of the third service packet is the second user equipment. A next hop device of the second user equipment is the second network device, that is, the second user equipment is connected to the network by using the second network device. The network may be the campus network. The control device determines, based on a destination address of the third packet, that the destination of the third packet is the control device itself. The control device determines, based on a destination address of the third service packet, that the control device stores a third routing entry. The third routing entry includes third address information and third next hop information, the third address information is used to identify the second user equipment, and the third next hop information is used to identify the second network device. The control device determines a level of a session from the third user equipment to the second user equipment based on the third service packet, where a source address of the third service packet identifies the third user equipment. The control device blocks sending of a third forwarding policy to the first network device based on the level, where the third forwarding policy is used to guide forwarding of a second data flow to which the third service packet belongs.

Optionally, the network is the campus network, and the campus network includes the control device, the first network device, and the second network device. The control device is a core network device, for example, a core switch or a core router. The first network device and the second network device are edge network devices, for example, edge switches or edge routers.

In this implementation, when the control device sends the forwarding policy to the network device, the control device may use address information of user equipment at a receive end as an index. For example, the control device sends the first forwarding policy to the first network device, where the first forwarding policy includes index information, and the index information includes address information of the first user equipment. After receiving the first forwarding policy, the first network device may determine, based on the index information, that the first forwarding policy is a forwarding policy sent to the first network device itself. Optionally, the index information may further include a VPN identifier.

Figure 3:
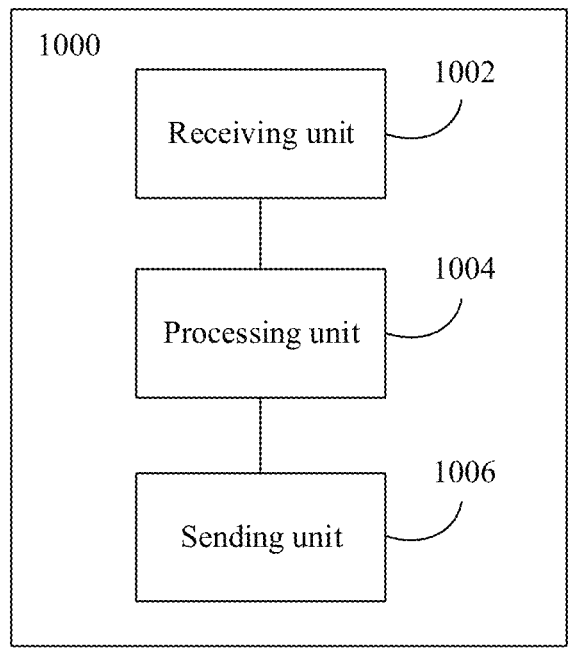
FIG. 3 is a schematic diagram of a structure of a first network device according to an embodiment.

FIG. 3 is a schematic diagram of a structure of a control device 1000 according to an embodiment. The control device 1000 shown in FIG. 3 may perform the corresponding steps performed by the control device in the methods in the foregoing embodiments. The control device 1000 is deployed in a communications network. The communications network further includes a first network device. Optionally, the communications network further includes a second network device, a third network device, and a fourth network device. As shown in FIG. 3, the control device 1000 includes a receiving unit 1002, a processing unit 1004, and a sending unit 1006.

The receiving unit 1002 is configured to receive a first packet sent by the first network device. The first packet includes a first service packet, a destination of the first packet is the control device, a destination of the first service packet is first user equipment, and the first user equipment is connected to a network by using the second network device.

The processing unit 1004 is configured to determine a first forwarding policy based on the first packet and a first routing entry. The first forwarding policy is used to guide forwarding of a first data flow to which the first service packet belongs, the first routing entry includes first address information and first next hop information, the first address information is used to identify the first user equipment, and the first next hop information is used to identify the second network device.

The sending unit 1006 is configured to send the first forwarding policy to the first network device.

Optionally, the receiving unit 1002 is configured to receive, through a first tunnel, the first packet sent by the first network device.

Optionally, when the processing unit 1004 determines the first forwarding policy based on the first packet and the first routing entry, the processing unit 1004 is further configured to: determine, based on a destination address of the first packet, that the destination of the first packet is the control device; determine the first routing entry based on a destination address of the first service packet; and determine the first forwarding policy based on the first routing entry.

Optionally, the first forwarding policy includes the first routing entry.

Optionally, the first forwarding policy includes a second routing entry. The second routing entry includes second address information and second next hop information, the second address information is used to identify the first user equipment, and the second next hop information is used to identify the third network device. The sending unit 1006 is further configured to send a second forwarding policy to the third network device. The second forwarding policy includes the first routing entry.

Optionally, before the processing unit 1004 determines the first forwarding policy based on the first packet and the first routing entry, the processing unit 1004 is further configured to determine, based on the first packet and the first routing entry, that a link from the first network device to the second network device is congested or faulty.

Optionally, the third network device is a firewall.

Optionally, the first forwarding policy further includes at least one of the following information: a first priority, a first rate, and a first VPN identifier. The first priority is used to indicate a priority of sending the first data flow by the first network device, the first rate is used to indicate a rate of sending the first data flow by the first network device, and the first VPN identifier is used to indicate a VPN to which the first user equipment belongs.

Optionally, before the receiving unit 1002 receives the first packet sent by the first network device, the receiving unit 1002 is further configured to receive first user equipment information sent by the second network device. The first user equipment information includes the first address information and first location information, and the first location information indicates the first next hop information. The processing unit 1004 is further configured to determine the first routing entry based on the first user equipment information.

Optionally, the first user equipment information further includes at least one of the following information: a second priority and a second VPN identifier. The second priority is used to indicate a priority of the first user equipment, and the second VPN identifier is used to indicate a VPN to which the first user equipment belongs.

Optionally, the processing unit 1004 is further configured to forward the first packet to the second network device based on the first routing entry.

Optionally, the receiving unit 1002 is further configured to receive a third packet sent by the first network device. The third packet includes a third service packet. A destination of the third packet is the control device, and a destination of the third service packet is second user equipment. The second user equipment is connected to the network by using the second network device. The processing unit 1004 is further configured to determine, based on a destination address of the third packet, that the destination of the third packet is the control device. The processing unit 1004 is further configured to determine a third routing entry based on a destination address of the third service packet. The third routing entry includes third address information and third next hop information. The third address information is used to identify the second user equipment, and the third next hop information is used to identify the second network device. The processing unit 1004 is further configured to determine a level of a session from third user equipment to the second user equipment based on the third service packet. A source address of the third service packet identifies the third user equipment. The processing unit 1004 is further configured to block sending of a third forwarding policy to the first network device based on the level. The third forwarding policy is used to guide forwarding of a second data flow to which the third service packet belongs. Further, optionally, the receiving unit 1002 is configured to receive, through the first tunnel, the third packet sent by the first network device.

Optionally, the sending unit 1006 is further configured to forward the third packet to the second network device based on the third routing entry.

Optionally, the first tunnel is any one of the following tunnels: a VXLAN tunnel, an MPLS-based tunnel, an SR tunnel, and a GRE tunnel.

The control device 1000 shown in FIG. 3 may perform the corresponding steps performed by the control device in the methods in the foregoing embodiments. In the foregoing implementations, the control device implements, based on a packet sent by a network device, intervention and control on a forwarding path of a data flow to which the packet belongs. Correspondingly, the network device forwards a packet flow according to a forwarding policy and an intervention and control requirement of the control device.

Figure 4:
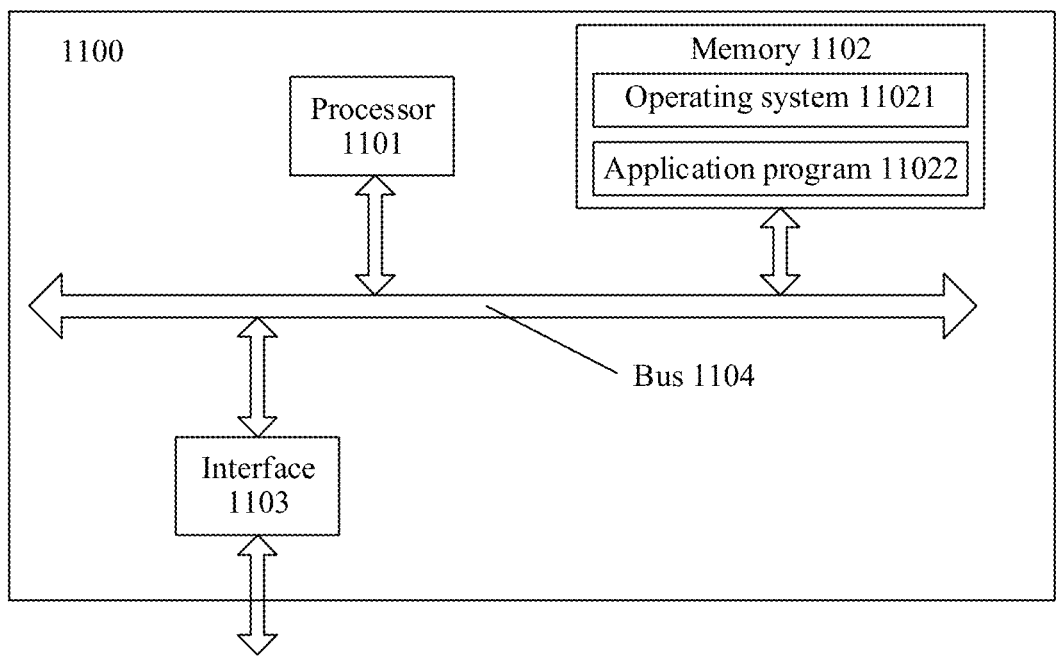
FIG. 4 is a schematic diagram of a hardware structure of a first network device according to an embodiment.

FIG. 4 is a schematic diagram of a hardware structure of a control device 1100 according to an embodiment. The control device 1100 shown in FIG. 4 may perform the corresponding steps performed by the control device in the methods in the foregoing embodiments.

As shown in FIG. 4, the control device 1100 includes a processor 1101, a memory 1102, an interface 1103, and a bus 1104. The interface 1103 may be implemented in a wireless or wired manner. The processor 1101, the memory 1102, and the interface 1103 are connected through the bus 1104.

The interface 1103 may include a transmitter and a receiver, is used by the control device to receive information from and send information to the first network device in the foregoing embodiments, and is used by the control device to receive information from and send information to the second network device or the third network device in the foregoing embodiments. For example, the interface 1103 is configured to receive a first packet sent by the first network device. In addition, the interface 1103 is configured to send a first forwarding policy to the first network device. For example, the interface 1103 is configured to support the procedures S104 and S106 in FIG. 2. The processor 1101 is configured to perform processing performed by the control device in the foregoing embodiments. For example, the processor 1101 is configured to determine the first forwarding policy, and/or perform other processes in the technology described herein. For example, the processor 1101 is configured to support the procedure S105 in FIG. 2. The memory 1102 is configured to store a program, code, or instructions, for example, store an operating system 11021 and an application program 11022. When executing the program, the code, or the instructions, the processor or a hardware device can complete a processing process related to the control device in the method embodiments. Optionally, the memory 1102 may include a ROM and a RAM. The ROM includes a BIOS or an embedded system, and the RAM includes an application program and an operating system. When the control device 1100 needs to run, a bootloader in the BIOS or the embedded system that is built into the ROM is used to boot a system to start, and boot the control device 1100 to enter a normal running state. After the control device 1100 enters the normal running state, the application program and the operating system in the RAM are run, to complete processing procedures related to the control device in the method embodiments.

It may be understood that FIG. 4 shows only a simplified design of the control device 1100. In an actual application, the control device may include any quantity of interfaces, processors, or memories.

Figure 5:
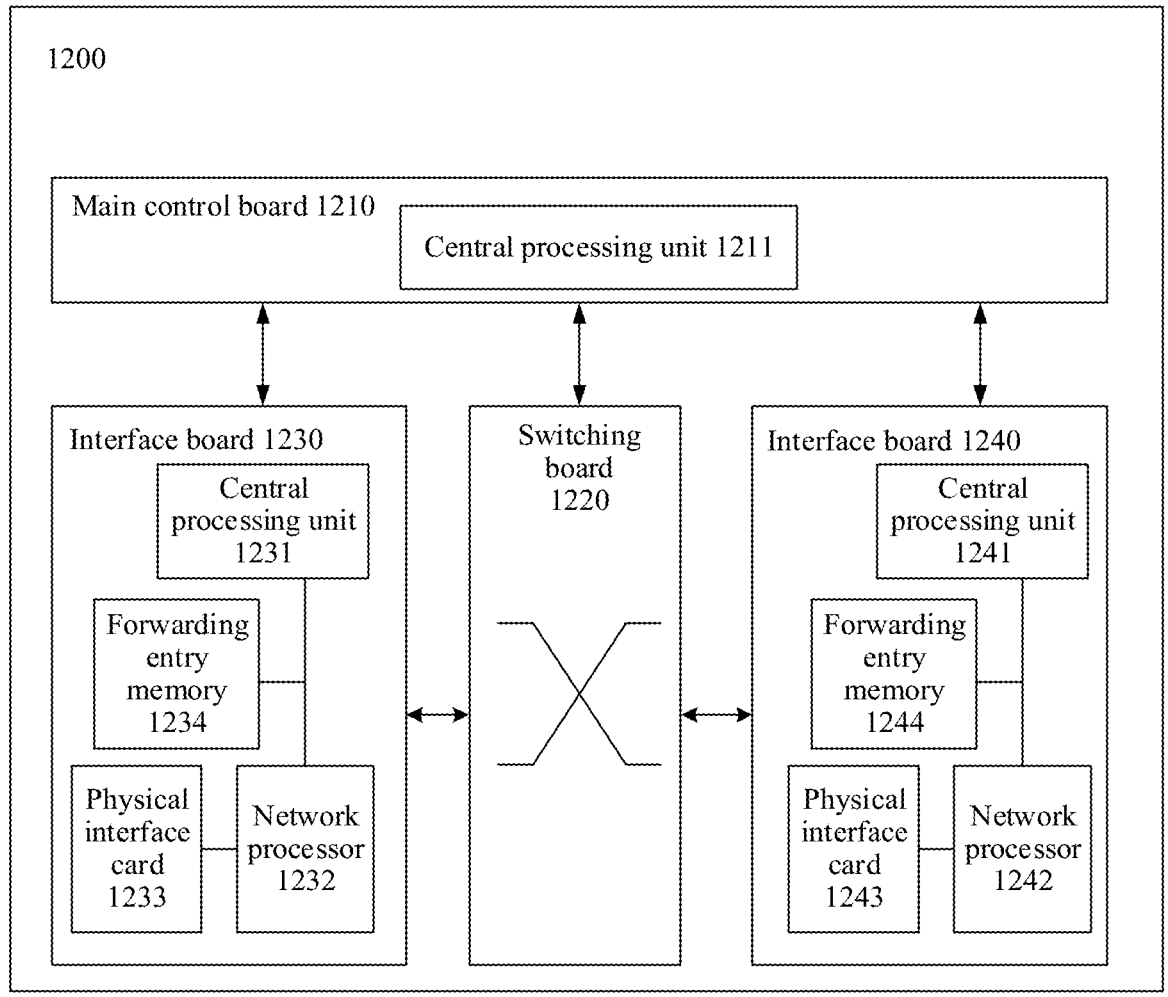
FIG. 5 is a schematic diagram of a hardware structure of another first network device according to an embodiment.

FIG. 5 is a schematic diagram of a hardware structure of another control device 1200 according to an embodiment. The control device 1200 shown in FIG. 5 may perform the corresponding steps performed by the control device in the methods in the foregoing embodiments.

As shown in FIG. 5, the control device 1200 includes a main control board 1210, an interface board 1230, a switching board 1220, and an interface board 1240. The main control board 1210, the interface boards 1230 and 1240, and the switching board 1220 are connected to a system backboard through a system bus for communication. The main control board 1210 is configured to complete functions such as system management, device maintenance, and protocol processing. The switching board 1220 is configured to complete data exchange between interface boards (an interface board is alternatively referred to as a line card or a service board). The interface boards 1230 and 1240 are configured to provide various service interfaces (for example, a Packet over SONET/SDH (POS), a gigabit Ethernet, and an asynchronous transfer mode (ATM) interface), and forward a data packet.

The interface board 1230 may include a central processing unit 1231, a forwarding entry memory 1234, a physical interface card 1233, and a network processor 1232. The central processing unit 1231 is configured to control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to send and receive traffic.

Specifically, the physical interface card 1233 is configured to receive a first packet sent by first user equipment. The physical interface card 1233 may be further configured to send a first forwarding policy to a first network device.

After receiving the first packet, the physical interface card 1233 sends the first packet to the central processing unit 1231. The central processing unit 1231 determines, based on information in a packet header of the first packet, that the first packet needs to be processed by the central processing unit 1231. Correspondingly, the central processing unit 1231 processes the first packet.

Optionally, after receiving the first packet, the physical interface card 1233 sends the first packet to the central processing unit 1231. The central processing unit 1231 determines, based on the information in the packet header of the first packet, that the first packet needs to be processed by a central processing unit 1211. The central processing unit 1231 sends the first packet to the central processing unit 1211, and the central processing unit 1211 processes the first packet.

The central processing unit 1231 is further configured to control the network processor 1232 to obtain the forwarding entry in the forwarding entry memory 1234, and the central processing unit 1231 is further configured to control the network processor 1232 to send the first forwarding policy to the first network device through the physical interface card 1233.

It should be understood that actions on the interface board 1240 are consistent with actions on the interface board 1230 in this embodiment. For brevity, details are not described. It should be understood that the control device 1200 in this embodiment may correspond to functions and/or various steps implemented in the foregoing method embodiments. Details are not described herein again.

In addition, it should be noted that there may be one or more main control boards. When there are a plurality of main control boards, an active main control board and a standby main control board may be included. There may be one or more interface boards, and a control device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, a control device may not need a switching board, and an interface board provides a function of processing service data of an entire system. In a distributed forwarding architecture, a control device may have at least one switching board, and data exchange between a plurality of interface boards is implemented through the switching board, to provide a large-capacity data exchange and processing capability. Therefore, a data access and processing capability of a control device in the distributed architecture is better than that of a device in the centralized architecture. A specific architecture to be used depends on a specific networking deployment scenario, and is not limited herein.

In addition, an embodiment provides a computer storage medium, which is configured to store computer software instructions used by the foregoing control device. The computer storage medium includes a program designed to perform the foregoing method embodiments.

Figure 6:
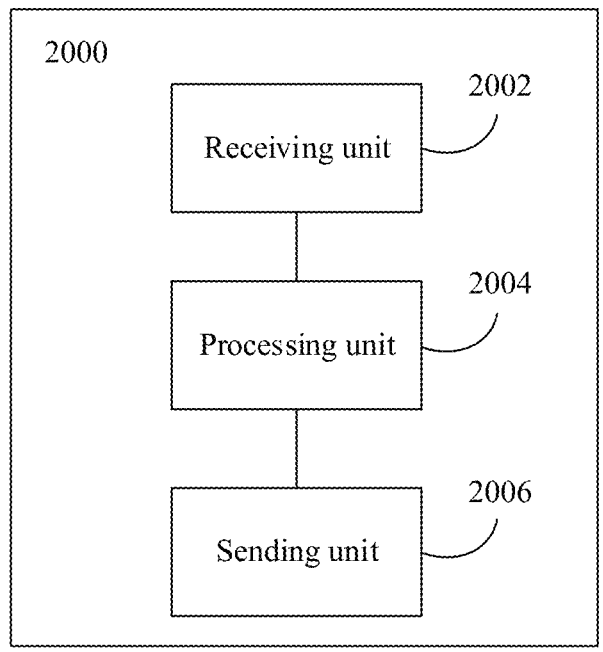
FIG. 6 is a schematic diagram of a structure of a second network device according to an embodiment.

FIG. 6 is a schematic diagram of a structure of a first network device 2000 according to an embodiment. The first network device 2000 shown in FIG. 6 may perform the corresponding steps performed by the first network device in the methods in the foregoing embodiments. The first network device is deployed in a communications network. The communications network further includes a control device, a second network device, a third network device, and a fourth network device. As shown in FIG. 6, the first network device 2000 includes a receiving unit 2002, a processing unit 2004, and a sending unit 2006.

The receiving unit 2002 is configured to receive a first service packet sent by third user equipment. A destination of the first service packet is first user equipment, and the first user equipment is connected to a network by using the second network device.

The processing unit 2004 is configured to determine, based on a destination address of the first service packet, that the first network device does not include a first routing entry, where the first routing entry includes first address information, and the first address information is used to identify the first user equipment.

The sending unit 2006 is configured to send a first packet to the control device, where a destination of the first packet is the control device, and the first packet includes the first service packet.

The receiving unit 2002 is further configured to receive a first forwarding policy sent by the control device. The first forwarding policy is used to guide forwarding of a first data flow to which the first service packet belongs.

Optionally, the sending unit 2006 is configured to send the first packet to the control device through a first tunnel.

Optionally, the first routing entry further includes first next hop information, and the first next hop information is used to identify the second network device.

Optionally, before the sending unit 2006 sends the first packet to the control device, the processing unit 2004 is further configured to generate the first packet based on a default routing entry. The default routing entry includes default address information and default next hop information, and the default next hop information is used to identify the control device.

Optionally, the first forwarding policy includes the first routing entry.

Optionally, the receiving unit 2002 is further configured to receive a second service packet sent by the third user equipment. A destination of the second service packet is the first user equipment. The sending unit 2006 is further configured to send the second service packet to the second network device according to the first forwarding policy.

Optionally, the first forwarding policy includes a second routing entry. The second routing entry includes second address information and second next hop information. The second address information is used to indicate the first user equipment, and the second next hop information is used to identify the third network device.

Optionally, the receiving unit 2002 is further configured to receive the second service packet sent by the third user equipment. The destination of the second service packet is the first user equipment. The sending unit 2006 is further configured to send the second service packet to the third network device according to the first forwarding policy.

Optionally, the first forwarding policy further includes at least one of the following information: a first priority, a first rate, and a first VPN identifier. The first priority is used to indicate a priority of sending the first data flow by the first network device, the first rate is used to indicate a rate of sending the first data flow by the first network device, and the first VPN identifier is used to indicate a VPN to which the first user equipment belongs.

Optionally, the default address information includes a default IP address and a default mask, a value of the default IP address is zero, and a value of the default mask is 0.

Optionally, the default address information includes a default MAC address, and a value of the default MAC address is zero.

Optionally, the first tunnel is any one of the following tunnels: a VXLAN tunnel, an MPLS-based tunnel, an SR tunnel, and a GRE tunnel.

The first network device 2000 shown in FIG. 6 may perform the corresponding steps performed by the first network device in the methods in the foregoing embodiments. In the foregoing implementations, the control device implements, based on a packet sent by a network device, intervention and control on a forwarding path of a data flow to which the packet belongs. Correspondingly, the network device forwards a packet flow according to a forwarding policy and an intervention and control requirement of the control device.

Figure 7:
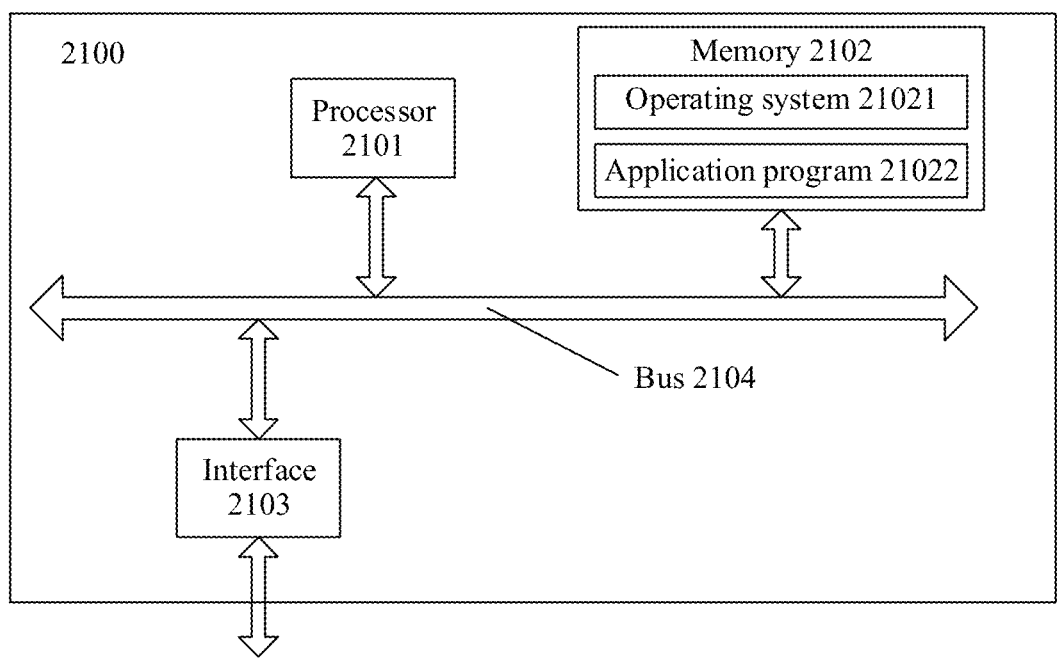
FIG. 7 is a schematic diagram of a hardware structure of a second network device according to an embodiment.

FIG. 7 is a schematic diagram of a hardware structure of a first network device 2100 according to an embodiment. The first network device 2100 shown in FIG. 7 may perform the corresponding steps performed by the first network device in the methods in the foregoing embodiments.

As shown in FIG. 7, the first network device 2100 includes a processor 2101, a memory 2102, an interface 2103, and a bus 2104. The interface 2103 may be implemented in a wireless or wired manner. The processor 2101, the memory 2102, and the interface 2103 are connected through the bus 2104.

The interface 2103 may include a transmitter and a receiver, and is used by the first network device to receive information or data from and send information or data to the control device in the foregoing embodiments. For example, the interface 2103 is configured to receive a first service packet sent by third user equipment. The interface 2103 is further configured to send a first packet to the control device. The interface 2103 is further configured to receive a first forwarding policy sent by the control device. For example, the interface 2103 is configured to support the procedures S101, S103, and S107 in FIG. 2. The processor 2101 is configured to perform processing performed by the first network device in the foregoing embodiments. For example, the processor 2101 is configured to determine, based on a destination address of the first service packet, whether the first network device includes a first routing entry. The processor 2101 is configured to generate a corresponding forwarding entry according to the first forwarding policy, and/or is configured to perform other processes in the technology described herein. For example, the processor 2101 is configured to support the procedure S102 in FIG. 2. The memory 2102 includes an operating system 21021 and an application program 21022, and is configured to store a program, code, or instructions. When executing the program, the code, or the instructions, the processor or a hardware device can complete the processing process related to the first network device in the foregoing method embodiments. Optionally, the memory 2102 may include a ROM and a RAM. The ROM includes a BIOS or an embedded system, and the RAM includes an application program and an operating system. When the first network device 2100 needs to run, a bootloader in the BIOS or the embedded system that is built into the ROM is used to boot a system to start, and boot the first network device 2100 to enter a normal running state. After the first network device 2100 enters the normal running state, the application program and the operating system in the RAM are run, to complete processing procedures related to the first network device in the method embodiments.

It may be understood that FIG. 7 shows only a simplified design of the first network device 2100. In an actual application, the first network device may include any quantity of interfaces, processors, or memories.

Figure 8:
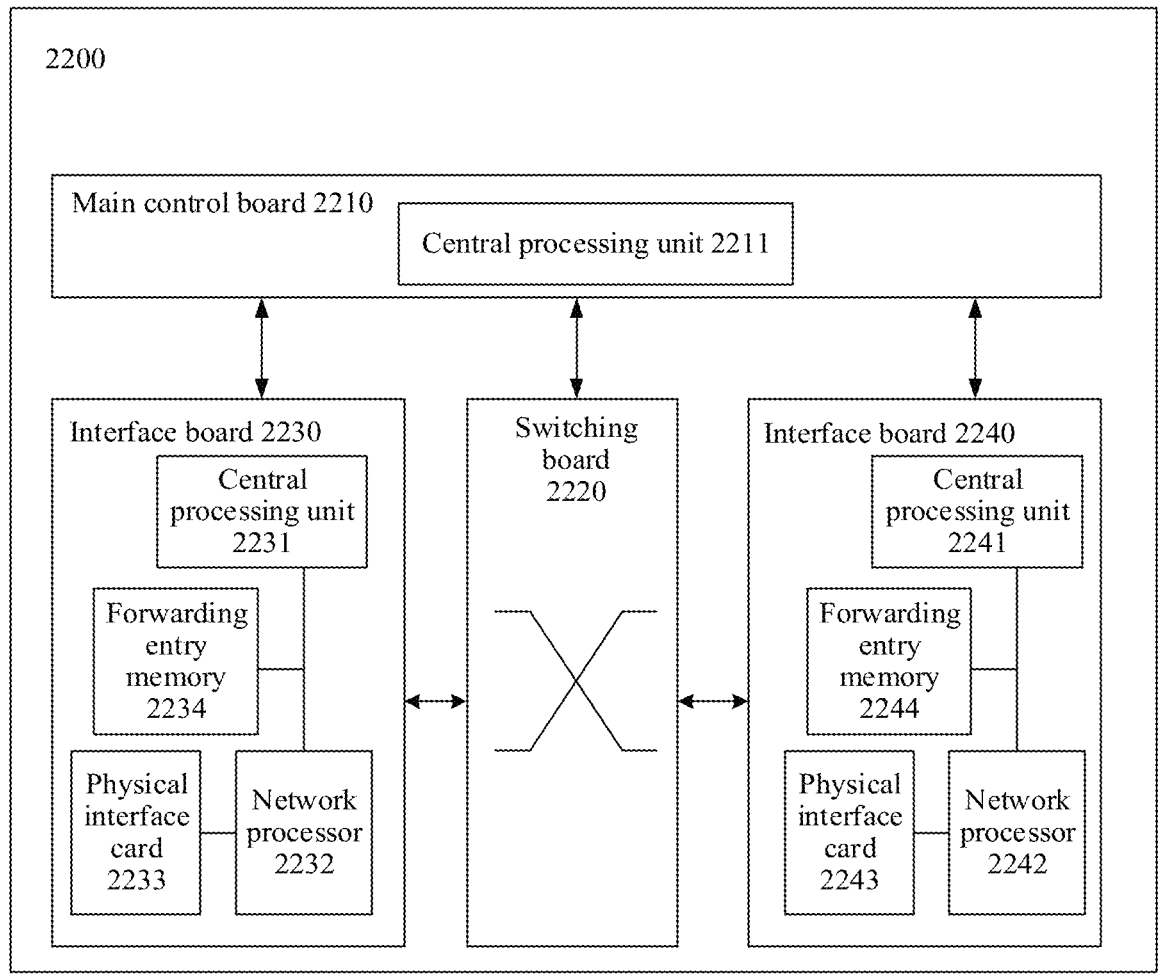
FIG. 8 is a schematic diagram of a hardware structure of another second network device according to an embodiment.

FIG. 8 is a schematic diagram of a hardware structure of another first network device 2200 according to an embodiment. The first network device 2200 shown in FIG. 8 may perform the corresponding steps performed by the first network device in the methods in the foregoing embodiments.

As shown in FIG. 8, the first network device 2200 includes a main control board 2210, an interface board 2230, a switching board 2220, and an interface board 2240. The main control board 2210, the interface boards 2230 and 2240, and the switching board 2220 are connected to a system backboard through a system bus for communication. The main control board 2210 is configured to complete functions such as system management, device maintenance, and protocol processing. The switching board 2220 is configured to exchange data between interface boards (the interface board is also referred to as a line card or a service board). The interface boards 2230 and 2240 are configured to provide various service interfaces (for example, a POS interface, a GE interface, and an ATM interface), and forward a data packet. In a possible implementation, the first network device 2200 is a blade server.

The interface board 2230 may include a central processing unit 2231, a forwarding entry memory 2234, a physical interface card 2233, and a network processor 2232. The central processing unit 2231 is configured to control and manage the interface board, and communicate with a central processing unit 2211 on the main control board 2210. The forwarding entry memory 2234 is configured to store a forwarding entry. The physical interface card 2233 is configured to receive and send traffic. The network processor 2232 is configured to control, based on the forwarding entry, the physical interface card 2233 to receive and send the traffic.

Specifically, the physical interface card 2233 is configured to receive a first service packet sent by third user equipment. The physical interface card 2233 is further configured to send a first packet. The physical interface card 2233 is further configured to receive a first forwarding policy.

After receiving the first service packet, the physical interface card 2233 sends the first service packet to the central processing unit 2231. The central processing unit 2231 determines, based on information in a packet header of the first service packet, that the first service packet needs to be processed by the central processing unit 2231. Correspondingly, the central processing unit 2231 processes the first service packet.

Optionally, after receiving the first service packet, the physical interface card 2233 sends the first service packet to the central processing unit 2231. The central processing unit 2231 determines, based on the information in the packet header of the first service packet, that the first service packet needs to be processed by the central processing unit 2211. The central processing unit 2231 sends the first service packet to the central processing unit 2211, and the central processing unit 2211 processes the first service packet.

The central processing unit 2231 is further configured to control the network processor 2232 to obtain the forwarding entry in the forwarding entry memory 2234, and the central processing unit 2231 is further configured to control the network processor 2232 to receive and send traffic through the physical interface card 2233.

It should be understood that actions on the interface board 2240 are consistent with actions on the interface board 2230 in this embodiment. For brevity, details are not described. It should be understood that the first network device 2200 in this embodiment may correspond to functions and/or various steps implemented in the foregoing method embodiments. Details are not described herein again.

In addition, it should be noted that there may be one or more main control boards. When there are a plurality of main control boards, an active main control board and a standby main control board may be included. There may be one or more interface boards, and a first network device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, a first network device may not need a switching board, and an interface board provides a function of processing service data of an entire system. In a distributed forwarding architecture, a first network device may have at least one switching board, and data exchange between a plurality of interface boards is implemented by using the switching board, to provide a large-capacity data exchange and processing capability. Therefore, a data access and processing capability of the first network device in the distributed architecture is better than that of a device in the centralized architecture. A specific architecture to be used depends on a specific networking deployment scenario, and is not limited herein.

In addition, an embodiment provides a computer storage medium, which is configured to store computer software instructions used by the foregoing first network device. The computer storage medium includes a program designed to perform the foregoing method embodiments.

An embodiment further includes a network system. The network system includes a control device and a first network device. The control device is the control device in FIG. 3, FIG. 4, or FIG. 5, and the first network device is the first network device in FIG. 6, FIG. 7, or FIG. 8.

Method or algorithm steps described in combination with the content disclosed may be implemented by hardware, or may be implemented by a processor by executing software instructions. The software instructions may include a corresponding software module, and the software module may be stored in a RAM memory, a flash memory, a ROM memory, an erasable programmable ROM (EPROM), an electrically erasable programmable ROM (EEPROM), a register, a hard disk, a removable hard disk, a compact disc ROM (CD-ROM), or any other form of storage medium known in the art. For example, a storage medium is coupled to a processor, so that the processor can read information from the storage medium or write information into the storage medium. Certainly, the storage medium may be a component of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in one or more of the foregoing examples, the functions described in the embodiments may be implemented by hardware or a combination of hardware and software. When the functions are implemented by the combination of hardware and software, the software may be stored in a computer readable medium or transmitted as one or more instructions or one or more pieces of code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this disclosure are further described in detail in the foregoing specific implementations. It should be understood that the foregoing descriptions are merely specific implementations.

What is claimed is:

1. A method implemented by a control device and comprising:
   receiving, from a second network device, first UE information comprising first address information and first location information, wherein the first address information identifies a first user equipment (UE) connected to a network using the second network device, wherein the first location information indicates first next hop information identifying the second network device;
   determining a first routing entry based on the first UE information, wherein the first routing entry comprises the first address information and the first next hop information, and wherein the first address information identifies the first UE;
   receiving, from a first network device, a first packet comprising a first service packet, wherein a first destination of the first packet is the control device, and wherein a second destination of the first service packet is the first UE;
   determining a first forwarding policy based on the first packet and the first routing entry, wherein the first forwarding policy guides forwarding of a first data flow to which the first service packet belongs; and
   sending, to the first network device, the first forwarding policy.

2. The method of claim 1, further comprising:
   determining, based on a first destination address of the first packet, that the first destination is the control device; and
   determining the first routing entry based on a second destination address of the first service packet.

3. The method of claim 1, wherein the first forwarding policy comprises the first routing entry.

4. The method of claim 1, wherein the first forwarding policy comprises a second routing entry, the second routing entry comprises second address information and second next hop information, wherein the second address information identifies the first user equipment, wherein the second next hop information identifies a third network device, and wherein the method further comprises sending, to the third network device, a second forwarding policy comprising the first routing entry.

5. The method of claim 4, wherein before determining the first forwarding policy, the method further comprises determining, based on the first packet and the first routing entry, that a link from the first network device to the second network device is congested or faulty.

6. The method of claim 4, wherein the third network device is a firewall.

7. The method of claim 3, wherein the first forwarding policy further comprises a first priority, a first rate, or a first virtual private network (VPN) identifier, wherein the first priority indicates a priority of sending the first data flow by the first network device, wherein the first rate indicates a rate of sending the first data flow by the first network device, and wherein the first VPN identifier indicates a VPN to which the first user equipment belongs.

8. The method of claim 1, wherein the first UE information further comprises a second priority or a second VPN identifier, wherein the second priority indicates a priority of the first UE, and wherein the second VPN identifier indicates a VPN to which the first UE belongs.

9. The method of claim 1, further comprising forwarding the first packet to the second network device based on the first routing entry.

10. The method of claim 1, further comprising:
receiving, from the first network device, a third packet comprising a third service packet, wherein a first destination of the third packet is the control device, and wherein a second destination of the third service packet is a second UE connected to the network using the second network device;
determining, based on a first destination address of the third packet, that the first destination of the third packet is the control device;
determining a third routing entry based on a second destination address of the third service packet, wherein the third routing entry comprises third address information and third next hop information, wherein the third address information identifies the second UE, and wherein the third next hop information identifies the second network device;
determining a level of a session from a third UE to the second UE based on the third service packet, wherein a source address of the third service packet identifies the third UE; and
blocking sending of a third forwarding policy to the first network device based on the level, wherein the third forwarding policy guides forwarding of a second data flow to which the third service packet belongs.

11. The method of claim 10, further comprising forwarding the third packet to the second network device based on the third routing entry.

12. The method of claim 1, further comprising further receiving the first packet through a first tunnel, wherein the first tunnel is a Virtual extensible Local Area Network (VXLAN) tunnel, a multi-protocol label switching (MPLS) tunnel, a segment routing (SR) tunnel, or a Generic Routing Encapsulation (GRE) tunnel.

13. A control device comprising:
a memory configured to store instructions; and
one or more processors coupled to the memory and configured to execute the instructions to cause the control device to:
receive, from a second network device, first UE information comprising first address information and first location information, wherein the first address information identifies a first user equipment (UE) connected to a network using the second network device, wherein the first location information indicates first next hop information identifying the second network device;
determine a first routing entry based on the first UE information, wherein the first routing entry comprises the first address information and the first next hop information, and wherein the first address information identifies the first UE;
receive, from a first network device, a first packet comprising a first service packet, wherein a first destination of the first packet is the control device, and wherein a second destination of the first service packet is the first UE;
determine a first forwarding policy based on the first packet and the first routing entry, wherein the first forwarding policy guides forwarding of a first data flow to which the first service packet belongs; and
send, to the first network device, the first forwarding policy.

14. A first network device comprising:
a memory configured to store instructions; and
one or more processors coupled to the memory and configured to execute the instructions to cause the first network device to:
receive, from a third user equipment (UE), a first service packet destined for a first user equipment (UE) connected to a network using a second network device;
determine, based on a destination address of the first service packet, that the first network device does not comprise a first routing entry, wherein the first routing entry comprises first address information, and wherein the first address information identifies the first user equipment (UE);
send, to a control device, through a tunnel, and in response to the first network device not comprising the first routing entry, a first packet destined for the control device, wherein the first packet comprises the first service packet; and
receive, from the control device and in response to the first packet, a first forwarding policy configured to guide forwarding of a first data flow to which the first service packet belongs.

15. The first network device of claim 14, wherein the one or more processors are further configured to execute the instructions to cause the first network device to generate the first packet based on a default routing entry, wherein the default routing entry comprises default address information and default next hop information, and wherein the default next hop information identifies the control device.

16. The first network device of claim 14, wherein the first forwarding policy comprises the first routing entry, wherein the first routing entry further comprises first next hop information, and wherein the first next hop information identifies the second network device.

17. The first network device of claim 16, wherein the one or more processors are further configured to execute the instructions to cause the first network device to:
   receive, from the third UE, a second service packet destined for the first user equipment; and
   send, to the second network device according to the first forwarding policy, the second service packet.

18. The first network device of claim 14, wherein the first forwarding policy comprises a second routing entry, wherein the second routing entry comprises second address information and second next hop information, wherein the second address information identifies the first user equipment, and wherein the second next hop information identifies a third network device.

19. The first network device of claim 18, wherein the one or more processors are further configured to execute the instructions to cause the first network device to:
   receive, from the third UE, a second service packet destined for the first user equipment (UE); and
   send, to the third network device according to the first forwarding policy, the second service packet.

20. The first network device of claim 15, wherein the destination address matches the default address information.

* * * * *

UNITED STATES PATENT AND TRADEMARK OFFICE
CERTIFICATE OF CORRECTION

| | | |
|---|---|---|
| PATENT NO. | : 12,068,955 B2 | |
| APPLICATION NO. | : 17/502466 | |
| DATED | : August 20, 2024 | |
| INVENTOR(S) | : Xingjian He and Haibo Wang | |

It is certified that error appears in the above-identified patent and that said Letters Patent is hereby corrected as shown below:

In the Claims

Claim 12, Column 27, Line 67: "Virtual extensible Local Area Network" should read "Virtual eXtensible Local Area Network".

Signed and Sealed this
First Day of October, 2024

Katherine Kelly Vidal
*Director of the United States Patent and Trademark Office*